United States Patent [19]
Bedford-Roberts

[11] Patent Number: 5,864,339
[45] Date of Patent: Jan. 26, 1999

[54] FREEHAND INPUT INFORMATION MANAGEMENT DEVICE AND METHOD

[75] Inventor: James Bedford-Roberts, Bristol, United Kingdom

[73] Assignee: Hewlett-Packard Company, Palo Alto, Calif.

[21] Appl. No.: 750,728
[22] PCT Filed: Jul. 28, 1994
[86] PCT No.: PCT/GB94/01628
  § 371 Date: Dec. 16, 1996
  § 102(e) Date: Dec. 16, 1996
[87] PCT Pub. No.: WO96/03687
  PCT Pub. Date: Feb. 8, 1996
[51] Int. Cl.[6] .......................................................... G06F 3/00
[52] U.S. Cl. ............................................ 345/339; 382/187
[58] Field of Search ..................................... 345/326–358, 345/173, 179, 180–184, 187, 188

[56] References Cited

U.S. PATENT DOCUMENTS

Re. 34,476  12/1993  Norwood ................................. 3822/13
5,404,439   4/1995   Moran et al. ............................ 345/326
5,572,651   11/1996  Weber et al. ............................ 345/326

OTHER PUBLICATIONS

IBM Technical Disclosure Bulletin, vol. 34, No. 10A, Mar. 1992, New York US p. 113.
'Multi–Line Listbox Control for Compound Entiries' see p. 113, line 28—line 34.

*Primary Examiner*—A. Katbab

[57] ABSTRACT

A device for storing information electronically and which has a pen-sensitive screen enabling a user to make freehand input has the screen divided into two areas—a main area and a subsidiary area adjacent the main area.

The user can tag items of freehand input causing a tag item to be displayed alongside the freehand input and can subsequently manipulate (eg delete, move, copy) the freehand input by selecting and manipulating the associated tag item.

Tag items provide a permanent way of structuring data and are an elegant way of uniting several data manipulations.

20 Claims, 2 Drawing Sheets

FREEHAND INPUT INFORMATION MANAGEMENT DEVICE AND METHOD

TECHNICAL FIELD

The present invention relates to a device for storing information electronically and which has a pen-sensitive screen for a user to make freehand input. The device may be a handheld device for the storage and manipulation of personal data with a pen/stylus for user input.

BACKGROUND ART

There are already several pen-based handheld computer products on the market for the storage and manipulation of personal data. Examples of these are the Apple Newton, the Tandy Zoomer and the Amstrad PenPad. In these products the user has to become familiar with several unrelated mechanisms in order to perform manipulations on the data stored in the device. The term 'manipulations' refers to operations such as moving, deleting, copying etc of data. In addition, the methods of selecting data for manipulation usually effect only a transient selection so that further manipulation of the same data requires the data to be reselected.

DISCLOSURE OF INVENTION

According to the present invention we provide a computer having:
  means enabling a user to make freehand input;
  means for displaying the freehand input in a main screen area;
  means for allowing the user to tag an item of freehand input so that a tag item is subsequently displayed adjacent the said freehand input in a subsidiary screen area associated with the main screen area;
  whereby the tagged freehand input can subsequently be manipulated by means of the tag item.

The present invention has the advantage of providing a simple and elegant way of uniting several manipulations using the single artefact of tag items. Tag items provide a way of permanently structuring data and can be reused as often as desired. The artefact of tag items is particularly useful in the context of a small screen device for storing and manipulation of personal information where convenient data manipulation is particularly important.

In the embodiment to be described, a tag item is selected prior to manipulation of the tagged freehand input and creation of a tag item automatically results in selection of the newly created tag item.

In a particular embodiment to be described, the device is configured so that only the subsidiary screen area recognises user input relating to tag item manipulations. The device may comprise means enabling a user to select a plurality of tag items at any one time. This complicates the user interface of the device but may be useful in certain application, for example in associating more than one address with a message.

The tag item manipulations typically comprise moving, copying and deleting tag items and the associated freehand input and may further include the creation of a new page with the tagged item as its title.

BRIEF DESCRIPTION OF DRAWINGS

A particular embodiment of the present invention will now be described, by way of example, with reference to the accompanying drawings of which.

BEST MODE FOR CARRYING OUT THE INVENTION AND INDUSTRIAL APPLICABILITY

Figure 1:
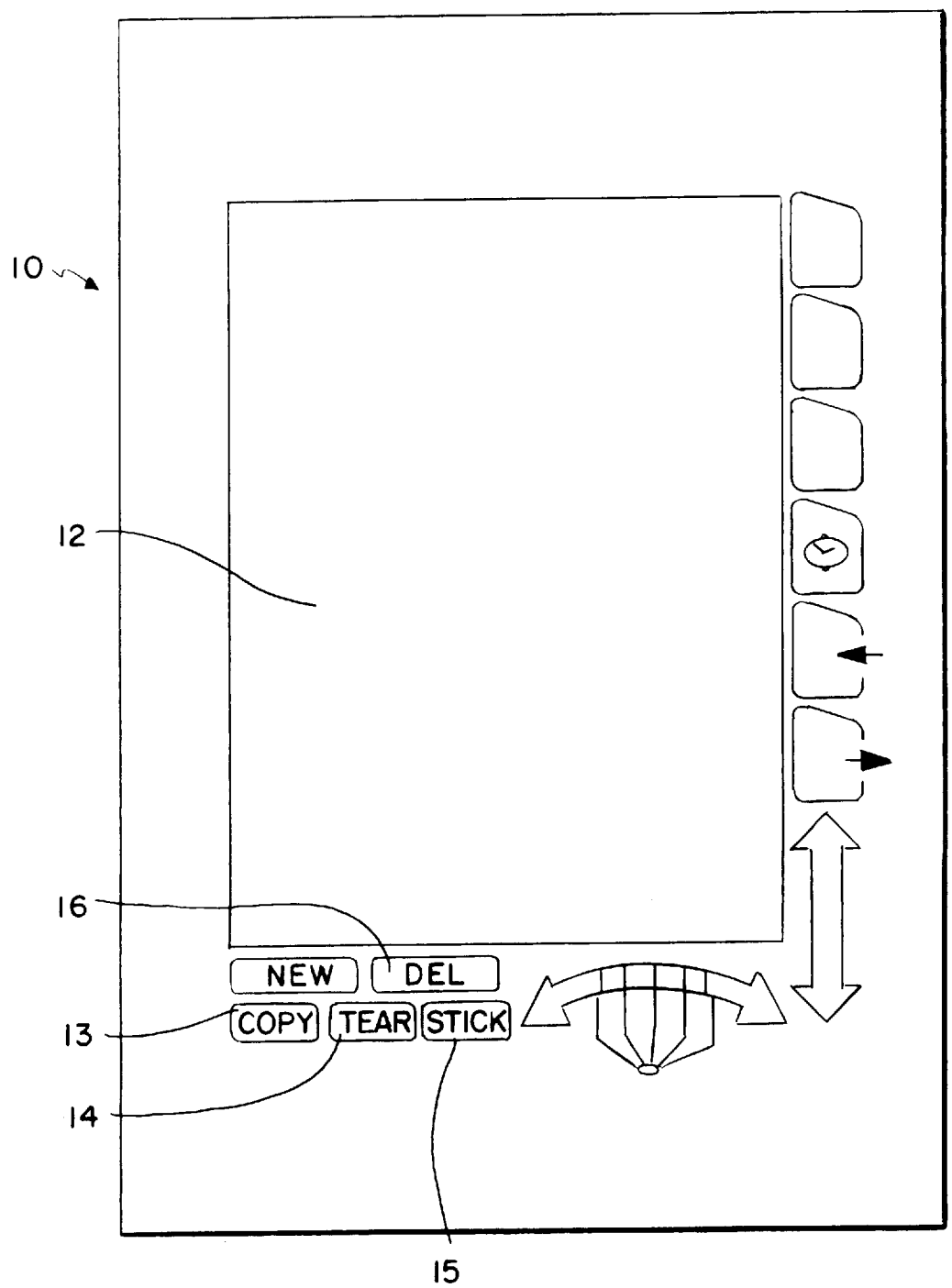
FIG. 1 is a diagram of a device according to the present invention.

FIG. 1 shows a pen-based handheld device 10 for storing and displaying pages of electronic information comprising a display screen 12. The user makes input using a pen (not shown). The device 10 also comprises buttons 13,14,15 and 16 for copying, moving ('tear' and 'stick' buttons) and deleting items. The device 10 also comprises other buttons which are not relevant to the present invention.

Figure 2:
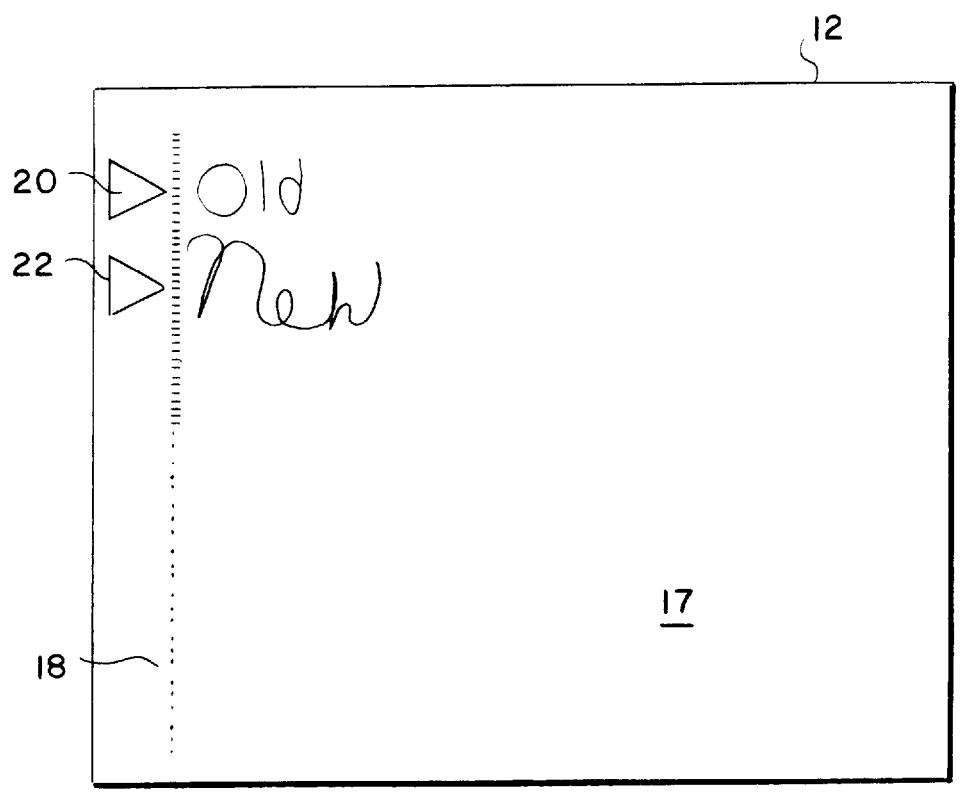
FIG. 2 is a diagram of the screen of the device of FIG. 1.

Referring to FIG. 2, the screen 12 is divided into two parts—a main part 17 and a subsidiary screen area 18.

The user can make freehand or 'scribble' input using the pen on the surface of the screen 12. An example is shown in FIG. 2 in which the words 'old' and 'new' have been written by the user. It is possible to tag any such freehand input with tag items, examples of which are referenced 20 and 22. In order to create a tag item against an item of freehand input, the user simply taps the pen in the area 18 adjacent to the relevant freehand input. For example, tapping the pen in the area 18 adjacent to the word 'old' in FIG. 2 causes the tag item 20 to appear.

The following algorithm provides a simple example of how pen strokes may be associated with tag items ('bullets'):

```
AssociateStrokeWithBullet(stroke){
    bullet = GetTopBulletOnPage();
    if((bullet == NO_BULLET) OR
                                (topOf(bullet) BELOW topOf(stroke))){
        AssociateStrokeWithPage(stroke);
    }else{
        do{
            previousBullet = bullet
            bullet = GetBulletBelow(bullet);
        }until((bullet == NO_BULLET) OR (topOf(bullet) BELOW topOf(stroke)));
        AssociateStrokeWithBullet(previousBullet);
    }
}
```

In this case a stroke is associated with the nearest tag item whose top point is above or level with the top point of the received stroke. If no such tag item exists then the scribble is associated with the page instead (this simply reflects the fact that the stroke cannot currently be selected using any tag items).

This algorithm will be called when a new stroke is input by the user. The algorithm also needs to be used whenever tag items are moved or created. In this case it is necessary to reevaluate the association of every scribble on the current page. There are many possible improvements for this algorithm. For example, the algorithm may be biassed in favour of associating a new stroke with the same tag item as the previous stroke. It may also use information about the bottom and mid-height of the stroke and the tag item. Optimisations for faster computation are also possible.

A tap with the pen on an existing tag item causes that tag item to be selected. Selection of a tag item is indicated by a colour change as shown for the tag item 22 in FIG. 2. Only one tag item can be selected at any one time. The next step is for the user to indicate what manipulation it is desired to make on the selected tag item and associated freehand input. This is done using the buttons 13,14,15 and 16 of the device 10.

For example, if it is desired to move the selected tag item 22, the user presses the 'tear' button 14 and the selected item drops to the bottom of the page awaiting the user to choose where to move the item to and to press the 'stick' button 15 which completes the manipulation. If it is desired to copy the selected item, the user presses the copy button 13 and the selected item drops to the bottom of the page awaiting the user to choose where to copy the item to and to press the 'stick' button 15 which completes the copy manipulation. If it is desired to delete the selected tag item, the user presses the button 16 which causes the tag item 22 and the text 'new' to be deleted.

A double tap by the pen on a tag item causes the freehand input associated with the tapped tag item to become the title of a new page. In this way a hierarchy of pages and sub-pages can be constructed. The title of the new page is tagged with a reverse arrow which, when tapped reverts the display to the original page. The operation is recursive in that it is possible to create tagged freehand input in the sub-page and to double tap on the tag to create a further sub-page with the latest freehand input as its title. Likewise the new sub-page title will have a reverse arrow in the subsidiary screen area to allow the user to move upwardly in the hierarchy of sub-pages.

A pseudo-code implementation of this embodiment of the present invention is as follows. The operations described below show how tag items (called 'bullets') may be selected or deselected and the operations that are affected by there being a selected tag item.

```
PenDown(position){
    if(InMarginArea(position)){
        bulletUnderPen = GetAnyBulletUnderPen();
        if(bulletUnderPen){
            if(DoubleTap()) ShowBulletAsSubPage(bulletUnderPen);
            else{/* Toggle bullet state */
                if(SelectedBulletIs(bulletUnderPen))
                    SetSelectedBullet(NONE);
                else SetSelectedBullet(bulletUnderPen);
            }
        }else{
            SetSelectedBullet(CreateANewBullet());
        }
    }else{/* Not in margin */
        SetSelectedBullet(NONE);
    }
}
PenUp(position){
    if(NOT SelectedBulletIs(NONE)){
                    /* If some bullet is selected at this point . . .*/
        EraseCurrentPenStroke();
                    /* . . then this is not an ordinary pen stroke . . . */
        MoveSelectedBulletAnd ScribbleTo(position);
                            /* . . . it's a bullet move. */
    }
}
UserHasPressedDelete(){
    if(SelectedBulletIs(NONE)) DeleteCurrentPage();
                    /* if no selected bullet, delete page */
    else DeleteSelectedBulletAndScribble();
}
UserHasPressedTear(){
    if(SelectedBulletIs(NONE)) TearCurrentPage();
    else TearSelectedBulletAndScribble();
}
UserHasPressedCopy(){
    if(SelectedBulletIs(NONE)) CopyCurrentPage();
    else CopySelectedBulletAndScribble();
}
```

The invention provides a simple and user-friendly way of manipulating freehand input. There are several possible modifications and variations on the above-described embodiment. The range of manipulations unified by tag items may vary according to the particular device embodying the present invention. An example would be that selection of a tag item associated with a telephone number would cause the number to be rung when a 'send' or 'phone' button is pressed.

The appearance of the tag items can be varied according to requirements and may be made customisable by the user. Different types of tag item could be used for different types of data eg. a sub-page which has further data at a lower level could be tagged with a differently presented tag item from sub-pages without such further data.

The subsidiary area 18 shown as a left hand margin in FIG. 2 could made larger or smaller and could appear on any edge of the displayed page.

The device 10 may be configured so that if tag items are moved within the area 18, automatic rearrangement of the tag items occurs to avoid one tag item overlapping with another or freehand input associated with one tag item overlapping with freehand input associated with another tag item. This can be achieved by causing the original tag item to move down the screen a predetermined distance to provide enough space for the other tag item and associated input.

Another possible feature would be to allow more than one tag item to be selected at any one time. An example of when this feature could be useful is when the tag items are associated with addresses and it is desired to send a message to more than one addressee. Since the selection of more than one tag item could lead to ambiguity with respect to some manipulations eg move, this feature would probably best be one which the user could invoke as required.

Tag items may be able to be created in ways other than by a tap of the pen in the area 18. For example, a tag item may be created whenever the user performs a pen stroke which is entirely contained in the area 18. The tag item would be positioned according to the position of a predetermined part of the stroke eg the beginning or the end of the stroke.

It will be seen that the present invention provides a particularly effective way of marking and manipulating data stored on small-screen devices.

I claim:

1. A device for storing information electronically comprising:
    means enabling a user to make freehand input;
    means for displaying the freehand input in a main screen area;
    means for allowing the user to tag an item of freehand input so that a tag item is subsequently displayed adjacent the said freehand input in a subsidiary screen area associated with the main screen area;
    whereby the tagged freehand input can subsequently be manipulated by means of the tag item.

2. A device according to claim 1 wherein a tag item is selected prior to manipulation of the tagged freehand input.

3. A device according to claim 2 wherein creation of a tag item automatically results in selection of the newly created tag item.

4. A device according to claim 3 which is configured so that only the subsidiary screen area recognizes user input relating to tag manipulation.

5. A device according to claim 3 wherein tag item manipulations comprise moving, copying and deleting.

6. A device according to claim 2 comprising means enabling a user to select a plurality of tag items at any one time.

7. A device according to claim 6 wherein tag item manipulations comprise moving, copying and deleting.

8. A device according to claim 2 which is configured so that only the subsidiary screen area recognizes user input relating to tag manipulation.

9. A device according to claim 2 wherein tag item manipulations comprise moving, copying and deleting.

10. A device according to claim 1 which is configured so that only the subsidiary screen area recognises user input relating to tag manipulation.

11. A device according to claim 10 wherein tag item manipulations comprise moving, copying and deleting.

12. A device according to claim 1 wherein tag item manipulations comprise moving, copying and deleting.

13. A method for storing information electronically comprising the steps:

providing a pen and an inputting surface upon which a user draws a freehand figure with the pen;

creating a data representation of the figure;

displaying the figure in a main screen area;

providing a tagging procedure for identifying the figure with a tag in response to the user touching the pen adjacent the figure on one side of the figure, the tag for the figure being displayed in a subsidiary screen area associated with the main screen area; and manipulating the data representation of the figure thus tagged in response to user manipulations of the tag.

14. The method of claim 13 wherein a step of selecting a tagged figure precedes the step of manipulating the data representation of the tagged figure.

15. The method of claim 14 wherein the tagging procedure causes a figure thus tagged to also be automatically selected.

16. The method of claim 14 wherein the steps of tagging figures, selecting tagged figures, and manipulating tagged figures are completed only in response to user inputs in a subsidiary screen area separate from the main screen area.

17. The method of claim 16 wherein tagging the figure occurs in response to the user tapping the pen in the subsidiary screen area adjacent the figure, and selecting the figure occurs in response to the user tapping the pen on the associated tag.

18. A device for storing information electronically comprising:

an input surface upon which a user can indicate a freehand figure with a pen, the device creating a data representation of the figure thus indicated by the user;

a main screen area for displaying the indicated figure;

a subsidiary screen area for displaying a tag associated with the figure, the tag being created in response to a user command indicated by manipulating the pen in an area adjacent one side of the figure, the user modifying the data representation and display of the figure by pen actions directed to the tag.

19. The device of claim 18 wherein modification of the data representation and display of the figure includes moving, copying and deleting the figure.

20. The device of claim 19 wherein actions directed to the tag for modification of the data representation and display of the figure are recognized only in the subsidiary screen area.

* * * * *